United States Patent Office 3,284,353
Patented Nov. 8, 1966

3,284,353
DRILLING MUD AND PROCESS
Jack B. Batdorf, Wilmington, and Richard T. Gardner, Jr., Newark, Del., assignors to Hercules Incorporated, a corporation of Delaware
No Drawing. Filed Sept. 27, 1963, Ser. No. 311,964
4 Claims. (Cl. 252—8.5)

The present invention relates to water base drilling muds of high salt content and low solids content, and more particularly to such a drilling mud characterized in that its viscosity and water content are especially stable during storage and use. Still more particularly, the present invention relates to such a drilling mud composition comprising a water-soluble carboxymethyl-hydroxyethyl mixed cellulose ether (CMHEC) of a critical carboxymethyl D.S. and a critical hydroxyethyl M.S.

In the art of drilling wells, especially drilling by the rotary method, it is necessary to use a drilling mud, as is well understood in the art. The drilling mud lubricates the drill stem, carries the cuttings to the surface of the well, and forms a filter cake on the walls of the well preventing loss of at least any substantial amount of water from the drilling mud to the natural formations in the well. In order to perform these important functions properly, the drilling mud must have suitable viscosity and other qualities and these conditions must remain stable at all times in spite of adverse conditions encountered in drilling the well. For instance, the viscosity must be fairly high and yet low enough to be readily pumpable.

For many reasons it is desirable to be able to use a drilling mud with a high salt content. For instance, (1) it curbs bacterial action. (2) In drilling in or through formations of high salt content it is necessary in order to prevent the formation from being dissolved to the extent of cave-in of the borehole. (3) It prevents the clay particles used in the drilling mud from swelling which would otherwise substantially thicken the drilling mud. (4) It prevents the clay particles from settling out of suspension in the drilling mud. (5) It increases and maintains the density of the drilling mud within the desired range without increasing the suspended solids, and thus provides weight without sacrifice of low solids content. Low insoluble solids content is desirable to enable the drill bit to cut faster and to minimize maintenance problems caused by large amounts of abrasive solids. Increased weight is desirable to prevent blow-out. However, heretofore no suitable drilling mud has been provided for this type drilling. The major difficulty has been that in such a system the drilling mud is cut substantially by the salt (e.g. the cellulose ether precipitates) so that the drilling mud rapidly thins to a very unsatisfactory level, the clay particles settle out of the system, and there is a real danger of a blow-out occurring. Another difficulty encountered in drilling operations is that the drilling mud loses water to the formation surrounding the borehole thereby making the drilling mud too thick; so a water-loss control agent is needed for the drilling mud. It will be appreciated, of course, that salt is encountered in the earth when drilling in certain locations, which itself makes the drilling mud high in salt content even if one starts with a drilling mud containing no salt.

The purpose of the following two paragraphs is to explain the use herein and in the prior art of the terms "degree of substitution" ("D.S.") and "M.S."

There are three hydroxyl groups in each anhydroglucose unit in the cellulose molecule. D.S. is the average number of hydroxyl groups substituted in the cellulose per anhydroglucose unit. M.S. is the average number of moles of reactant combined with the cellulose per anhydroglucose unit. For the alkyl, carboxyalkyl, or acyl derivatives of cellulose, the D.S. and M.S. are the same. For the hydroxyalkyl derivatives of cellulose, the M.S. is generally greater than the D.S. The reason for this is that each time a hydroxyalkyl group is introduced into the cellulose molecule, an additional hydroxyl group is formed which itself is capable of hydroxyalkylation. As a result of this, side chains of considerable length may form on the cellulose molecule. The M.S./D.S. ratio represents the average length of these side chains. Thus, from the foregoing it will be seen that the D.S. of a cellulose derivative can be no higher than 3, whereas the M.S. may be considerably higher than 3, depending on the extent to which side chains are formed.

For the mixed ethers involved herein (i.e. CMHEC) the first valve given is the carboxymethyl D.S. and the second valve given is the hydroxyethyl M.S. Two types of CMHEC which are commercially available and which have been for several years are CMHEC of 0.3 carboxymethyl D.S. and 0.7 hydroxyethyl M.S. as well as CMHEC of 0.4 carboxymethyl D.S. and 0.3 hydroxyethyl M.S.

The temperatures which the drilling muds of the present invention may encounter during drilling a well in accordance with the present invention are within the range of approximately 25° C. to 80° C.

Prior art carboxymethylcellulose (CMC), hydroxyethyl cellulose (HEC) and CMHEC have been used as drilling mud additives but they are not suitable for the drilling muds of the present invention. HEC was investigated as a drilling mud additive in drilling muds for these wells and found to be inadequate due primarily to the fact that the HEC precipitated out of the mud at the elevated temperatures encountered in drilling the wells. CMC was then substituted for the HEC but it precipitated out of the mud at the lower temperatures encountered. Prior art CMHEC was then substituted for the CMC but it also precipitated out of the mud at the lower temperatures encountered in drilling the wells. Thus HEC precipitates out at a temperature of about 60° C. and higher, CMC precipitates out at about 25° C.–80° C. and prior art CMHEC precipitates out at about 25° C. and higher.

According to the present invention it has been found that the foregoing difficulties are overcome and the foregoing advantages are realized by employing the mixed ether CMHEC as a drilling mud additive. A very critical condition of the present invention is that the carboxymethyl D.S. must not exceed about 0.2 and the hydroxyethyl M.S. must be about 1.5–2.5. Preferably the carboxymethyl D.S. is 0.05–0.2 D.S.

The following examples illustrate specific embodiments of the present invention. These examples are not intended to restrict the present invention other than as defined in the appended claims. In these examples and elsewhere herein, unless otherwise indicated, parts, percent and ratios are by weight. All viscosities herein were measured with a standard Brookfield Synchro-Lectric LVF viscometer on aqueous solutions at 25° C. of the concentrations specified.

A laboratory brine was heated to compare, under the same conditions, the cellulose ethers of the present invention with conventional cellulose ethers for their performance in solutions containing high concentrations of several salts.

Portions of the brine were used to test the stability of the cellulose ethers therein at room temperature by comparing the viscosity of the cellulose ethers in water with their viscosity in the brine. Other portions of the brine were used to test the stability of the cellulose ethers therein at elevated temperature. This was determined by starting at room temperature and increasing the temperature until the cellulose ether precipitated out of the brine. A laboratory mud prepared by adding 3.5% attapulgite clay to a 26% NaCl aqueous solution was used to test the performance as drilling mud additives of the cellulose ethers as measured by Apparent Fann viscosity and water loss control. The brine formulation used is given in Table 1 hereinafter.

*Table 1*

| Ingredient: | Amount, percent |
|---|---|
| NaCl | 25.0 |
| KCl | 2.0 |
| $CaSO_4 \cdot \frac{1}{2}H_2O$ | 0.5 |
| $BaSO_4$ | 0.1 |
| $MgSO_4$ | 0.2 |
| Distilled $H_2O$ | 72.2 |

The brine formulation given in Table 1 hereinbefore was prepared by combining the listed ingredients, stirring the suspension mechanically for two hours, then filtering by suction to obtain a clear solution.

The mud formulation was prepared by adding 3.5% attapulgite clay to a 26% NaCl aqueous solution, stirring for at least two hours, and allowing to age at least one week before using.

Stability of the brine at room temperature was determined by adding thereto while stirring a sufficient amount of the air-dry test sample to give a concentration of 1% while stirring. Stirring was continued until substantially complete dispersion was obtained. The resulting test suspensions were then stored in sealed glass containers for 12 hours at 25° C., and the viscosities determined at that temperature. The spindle was allowed to rotate at least 3 minutes before making the determination.

Further details appear in Table 2 hereinafter.

*Table 2*

| Example No. | Cellulose Ether | CM[1] D.S. | HE[2] M.S. | Viscosity at 25° C., cps. | |
|---|---|---|---|---|---|
| | | | | In Water | In Brine |
| 1 | CMHEC | 0.2 | 2.5 | 800 | 3,900 |
| 2 | CMHEC | 0.1 | 2.5 | 840 | 3,150 |
| 3 | CMHEC | 0.2 | 1.5 | 1,224 | 5,520 |
| 4 | CMHEC | 0.1 | 1.5 | 2,780 | 4,700 |
| 5 | CMC | 0.7 | | 2,400 | 75 |
| 6 | HEC | | 2.5 | 2,260 | 3,400 |
| 7 | CMHEC | 0.3 | 0.7 | 5,240 | 28 |
| 8 | CMHEC | 0.4 | 0.7 | 1,500 | 100 |
| 9 | CMHEC | 0.2 | 1.0 | 1,340 | 180 |
| 10 | CMHEC | 0.3 | 1.0 | 1,620 | 120 |

[1] CM is carboxymethyl.
[2] HE is hydroxyethyl.

Stability at elevated temperatures of less than 100° C. was determined as follows. An oil bath was fitted with a thermometer and means for controlling temperature and providing slow mechanical agitation. The test solution of 0.5% cellulose ether in the laboratory brine contained in a 4-oz. wide-mouthed jar was placed in the bath, with the bath temperature set approximately 5° C. above the expected cloud point. The jar was then fitted with a rubber stopper holding a thermometer, and with a hole provided for a stirring rod. The solution was stirred slowly throughout the test procedure. By maintaining the temperature of the bath at about 5° C. above the expected cloud point, the solution temperature increased at a rate of about 1° C. per minute near this point. The cloud point was taken as the temperature at which turbidity was first noticed, until no further increase in turbidity could be detected.

Stability at elevated temperatures greater than 100° C. was determined as follows. 0.5% solutions of the test cellulose ether in the laboratory brine were prepared. A one-inch heavy-walled Carius tube, twelve inches long, was filled with this solution to about one-third capacity, and then sealed. A thermometer was attached to the tube so that its bulb was located about half way between the bottom and the top of the column of the solution. The tube and thermometer then were inserted into the heating bath. The bath was held at 95° C. for 10 minutes to allow the test solution to come to temperature, then raised at a rate of 1° C. per minute until the test was completed. The cloud point was determined as defined above.

Further details appear in Table 3 hereinafter.

*Table 3*

| Example No. | Cellulose Ether | CM[1] D.S. | HE[2] M.S. | Temperature (° C.) at which Cellulose Ether Precipitates from Brine |
|---|---|---|---|---|
| 11 | CMHEC | 0.2 | 2.5 | 95. |
| 12 | CMHEC | 0.1 | 2.5 | 85 and above. |
| 13 | CMHEC | 0.2 | 1.5 | 120 and above. |
| 14 | CMHEC | 0.1 | 1.5 | 100 and above. |
| 15 | CMC | 0.7 | | 25 up to 80. |
| 16 | HEC | | 2.5 | 60 and above. |
| 17 | CMHEC | 0.3 | 0.7 | 25 and above. |
| 18 | CMHEC | 0.4 | 0.7 | Do. |
| 19 | CMHEC | 0.2 | 1.0 | Do. |
| 20 | CMHEC | 0.3 | 1.0 | Do. |

[1] CM is carboxymethyl.
[2] HE is hydroxyethyl.

Apparent Fann viscosity and water loss were determined in accordance with the American Petroleum Institute recommended procedure 29, revised May 1958. The indicated amounts of cellulose ether (i.e. 1, 2, 3 and 4 lbs. per barrel) in the form of an air-dry powder was added to the mud while stirring. Stirring was continued for 1 hr. after adding the cellulose ether. Then the sample was allowed to stand for 2 hrs., stirred for an additional 15 minutes and tested.

Further details appear in Table 4 hereinafter.

*Table 4*

| Example No. | Cellulose Ether | CM[1] D.S. | HE[2] M.S. | Apparent Fann Viscosity of Mud, cps. | | | | Water Loss, Ml. | | | |
|---|---|---|---|---|---|---|---|---|---|---|---|
| | | | | 1* | 2* | 3* | 4* | 1* | 2* | 3* | 4* |
| 21 | CMHEC | 0.2 | 2.5 | 22.5 | 85 | 139 | 229 | 36 | 9 | 6 | 5 |
| 22 | CMHEC | 0.1 | 2.5 | 26 | 112 | 140 | 230 | 30 | 9 | 6 | 5 |
| 23 | CHMEC | 0.2 | 1.5 | 16 | 68 | 183 | 256 | 25 | 8 | 7 | 5 |
| 24 | CMHEC | 0.1 | 1.5 | 14 | 102 | 137 | 249 | 30 | 9 | 6.5 | 4 |
| 25 | CMC | 0.7 | | 9.5 | 39.5 | 83.0 | 152 | 22.5 | 11 | 8 | 6.5 |
| 26 | HEC | | 2.5 | 16 | 68 | 133 | 219 | 21 | 8.5 | 7 | 4 |
| 27 | CMHEC | 0.3 | 0.7 | 6 | 9 | 13 | 26 | 181 | 70 | 19 | 11 |
| 28 | CMHEC | 0.4 | 0.7 | 8 | 20 | 47 | 90 | 53 | 25 | 11 | 8 |
| 29 | CMHEC | 0.2 | 1.0 | 7 | 15 | 23 | 50 | 59 | 30 | 15 | 7 |
| 30 | CMHEC | 0.3 | 1.0 | 8 | 30 | 52 | 110 | 58 | 30 | 12 | 7 |

[1] CM is carboxymethhl.
[2] HE is hydroxyethyl.
*Cellulose ether concentration, lb./bbl.

In most cases the amount of CMHEC should be at least about 0.5 pound per barrel. Although larger amounts than the 4 pounds per barrel shown in the examples can be used, in most cases a more preferred amount will be about 1 pound to 2 pounds per barrel.

Preparation of the CMHEC used herein is not a part of the present invention. It has been well known publicly for many years how to prepare CMHEC. See, e.g., Klug U.S. Patent No. 2,618,632.

As many apparent and widely different embodiments of this invention may be made without departing from the spirit and scope thereof, it is to be understood that the invention is not limited to the specific embodiments thereof except as defined in the appended claims.

We claim:

1. A water base well drilling mud having improved stability and water loss properties under elevated temperature and high salt concentration conditions, said mud comprising an aqueous mixture containing suspended solids which forms a filter cake on the wall of the well and carboxymethyl hydroxyethyl cellulose having a carboxymethyl D.S. of 0.05–0.2 and a hydroxyethyl M.S. of 1.5–2.5, the amount of said carboxylmethyl hydroxyethyl cellulose being at least about 0.5 pound per barrel of said drilling mud.

2. The drilling mud of claim 1 wherein the amount of carboxymethyl hydroxyethyl cellulose employed is about 0.5–4 pounds per barrel of said drilling mud.

3. In a process of drilling a well with well drilling tools wherein there is circulated in the well a water base drilling mud containing suspended solids whereby a filter cake is deposited on the wall of said well, the improvement which comprises incorporating in said drilling mud carboxymethyl hydroxyethyl cellulose having a carboxymethyl D.S. of 0.05–0.2 and a hydroxyethyl M.S. of 1.5–2.5 in an amount of at least about 0.5 pound per barrel of said drilling mud and contacting said wall of said well with the resulting drilling mud to form said filter cake thereon, said resulting drilling mud having improved stability and water loss properties under elevated temperature and high salt concentration conditions.

4. Process of claim 3 wherein the amount of carboxymethyl hydroxyethyl cellulose employed is about 0.5–4 pounds per barrel of said drilling mud.

References Cited by the Examiner

UNITED STATES PATENTS

| | | | |
|---|---|---|---|
| 2,425,768 | 8/1947 | Wagner | 252—8.5 |
| 2,570,947 | 10/1951 | Himel et al. | 252—8.5 |
| 2,618,595 | 11/1952 | Gloor | 252—8.5 |
| 2,618,632 | 11/1952 | Klug | 260—231 |
| 3,131,177 | 4/1964 | Klug et al. | 260—231 |

SAMUEL H. BLECH, *Primary Examiner.*

JULIUS GREENWALD, ALBERT T. MEYERS,
*Examiners.*

H. B. GUYNN, *Assistant Examiner.*